(12) United States Patent
Ratnasamy et al.

(10) Patent No.: US 10,532,343 B2
(45) Date of Patent: Jan. 14, 2020

(54) REFORMING CATALYST MATERIAL AND PROCESSES FOR MAKING AND USING SAME

(71) Applicant: CLARIANT CORPORATION, Louisville, KY (US)

(72) Inventors: Chandra Ratnasamy, Louisville, KY (US); Jon P. Wagner, Louisville, KY (US); Yeping Cai, Louisville, KY (US); David B. Rogers, Louisville, KY (US); Jason E. Spencer, Palmyra, IN (US); Jeffery L. Braden, New Albany, IN (US)

(73) Assignee: CLARIANT CORPORATION, Louisville, KY (US)

( * ) Notice: Subject to any disclaimer, the term of this patent is extended or adjusted under 35 U.S.C. 154(b) by 211 days.

(21) Appl. No.: 15/594,878

(22) Filed: May 15, 2017

(65) Prior Publication Data

US 2017/0333875 A1    Nov. 23, 2017

Related U.S. Application Data

(60) Provisional application No. 62/338,598, filed on May 19, 2016.

(51) Int. Cl.
*C10G 35/06* (2006.01)
*H01M 8/10* (2016.01)
(Continued)

(52) U.S. Cl.
CPC .............. *B01J 21/04* (2013.01); *B01J 23/755* (2013.01); *B01J 32/00* (2013.01); *B01J 35/1019* (2013.01);
(Continued)

(58) Field of Classification Search
CPC ........ B01J 21/04; B01J 23/005; B01J 23/755; B01J 23/866; B01J 23/883; B01J 23/892;
(Continued)

(56) References Cited

U.S. PATENT DOCUMENTS 3,186,957 A * 6/1965 Stiles ..................... B01J 23/755
                                                      48/197 R
4,191,664 A    3/1980 McArthur
(Continued)

FOREIGN PATENT DOCUMENTS

CN    10-1912782   * 12/2010   ............. B01J 23/78
EP    0094206 A1  * 11/1983   ............. B01J 23/005

OTHER PUBLICATIONS

Daiane F. P. Suffredini et al., "Renewable hydrogen from glycerol reforming over nickel aluminate-based catalysts." Catalysis Today 289, pp. 96-104. (Year: 2017).*
(Continued)

*Primary Examiner* — Patricia L. Hailey

(57) ABSTRACT

The present disclosure relates to nickel/aluminum-containing catalyst materials useful, for example, as reforming catalysts, processes for making them, and processes for using them in molten carbonate fuel cells. In one aspect, the disclosure provides a catalyst material including an alumina carrier in an amount in the range of about 5 wt % to about 75 wt %; and a mixed metal oxide in an amount in the range of about 25 wt % to about 95 wt %, the mixed metal oxide including at least about 90 wt % of oxides of nickel and aluminum, the mixed metal oxide having an atomic ratio of nickel to aluminum in the range of about 60:40 to about 90:10, the mixed metal oxide being substantially free of zirconium, in the form of a composite of the alumina carrier and the mixed metal oxide.

22 Claims, 2 Drawing Sheets

(51) Int. Cl.

| | | |
|---|---|---|
| *H01M 8/1016* | (2016.01) | |
| *B01J 21/04* | (2006.01) | |
| *B01J 23/755* | (2006.01) | |
| *B01J 35/10* | (2006.01) | |
| *B01J 32/00* | (2006.01) | |
| *B01J 38/02* | (2006.01) | |
| *B01J 38/74* | (2006.01) | |

(52) U.S. Cl.
CPC ........... *B01J 35/1038* (2013.01); *B01J 38/02* (2013.01); *B01J 38/74* (2013.01)

(58) Field of Classification Search
CPC .... B01J 35/023; B01J 35/026; B01J 35/1014; B01J 35/1019; B01J 35/1038; H01M 8/10; H01M 8/1016; H01M 2008/1095; C10G 35/06
USPC ................ 502/335, 337, 524; 429/400, 479; 208/137
See application file for complete search history.

(56) References Cited

U.S. PATENT DOCUMENTS

| | | | | |
|---|---|---|---|---|
| 4,273,680 A | * | 6/1981 | Halluin | .................... B01J 23/75 502/259 |
| 4,285,837 A | * | 8/1981 | Sato | ....................... B01J 23/755 423/654 |
| 4,307,248 A | * | 12/1981 | Barnett | .................... B01J 23/75 502/235 |
| 6,855,305 B2 | * | 2/2005 | Kanno | ..................... A62D 3/20 423/240 S |
| 7,528,092 B2 | * | 5/2009 | Berben | ..................... B01J 23/78 502/251 |
| 8,604,248 B2 | | 12/2013 | King | |
| 8,633,131 B2 | * | 1/2014 | Lee | .......................... B01J 21/04 502/300 |
| 8,993,477 B2 | | 3/2015 | Milanov | |
| 2005/0081443 A1 | * | 4/2005 | Aiello | .................. B01D 53/864 48/198.3 |
| 2011/0038775 A1 | * | 2/2011 | Takahashi | ............... B01J 21/005 423/245.1 |
| 2011/0184206 A1 | * | 7/2011 | Suzuki | ................... B01J 23/755 560/103 |
| 2012/0063963 A1 | * | 3/2012 | Watanabe | .............. B01J 23/755 422/149 |
| 2013/0116118 A1 | * | 5/2013 | Milanov | ................ B01J 23/755 502/335 |
| 2019/0099744 A1 | * | 4/2019 | Al-Marri | ................ B01J 23/755 |

OTHER PUBLICATIONS

Ines Esma Achouri et al., "Diesel steam reforming: Comparison of two nickel aluminate catalysts prepared by wet-impregnation and co-precipitation." Catalysis Today 207, pp. 13-20. (Year: 2013).*

Cristina Jimenez-Gonzalez et al., "Structural characterisation of Ni/alumina reforming catalysts activated at high temperatures." Applied Catalysis A: General 466, pp. 9-20. (Year: 2013).*

* cited by examiner

REFORMING CATALYST MATERIAL AND PROCESSES FOR MAKING AND USING SAME

BACKGROUND OF THE DISCLOSURE

1. Field of the Disclosure

The present disclosure relates generally to catalyst materials and processes for making and using them. More particularly, the present disclosure relates to nickel/aluminum-containing catalyst materials useful, for example, as reforming catalysts, processes for making them, and processes for using them in molten carbonate fuel cells.

2. Technical Background

Molten-carbonate fuel cells are high-temperature fuel cells that can produce electrical energy through the net conversion of hydrogen and oxygen to water. The half-reactions are:

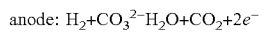

anode: $H_2 + CO_3^{2-} \rightarrow H_2O + CO_2 + 2e^-$

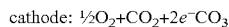

cathode: $\frac{1}{2}O_2 + CO_2 + 2e^- \rightarrow CO_3$

The electrolyte is typically alkali (e.g., Na and K) carbonate retained in a matrix (e.g., a ceramic matrix of $LiAlO_2$. The anode is typically nickel, and the cathode is typically nickel oxide. The $CO_2$ generated at the anode is typically recycled to the cathode where it is consumed.

Such fuel cells typically operate at temperatures on the order of 600-700° C., at which temperatures, the carbonate is a highly conductive molten salt form. Operation at such high temperatures can be advantageous in that it can provide high overall efficiency, even up to 50-60% conversion of the fuel's lower heating value to electricity without recovery and conversion of the exhaust heat. Moreover, the exhaust heat from the fuel cell is relatively hot, and thus may be recovered for the generation of steam, further increasing fuel cell efficiency. Efficiencies in excess of 60% can potentially be achieved with the incorporation of a bottoming cycle.

The hydrogen used in the fuel cell can be provided by a variety of methods. However, in many practical applications, the hydrogen is provided by the reformation of a carbonaceous fuel (e.g., natural gas, methane, petroleum gas, naptha, heavy oil, crude oil) to form hydrogen and $CO_2$. The water-gas shift reaction can be used to provide additional hydrogen. Example reactions for use of methane are provided below:

Reformation: $CH_4 + H_2O \rightarrow CO + 3H_2$

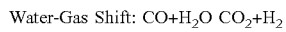

Water-Gas Shift: $CO + H_2O \rightarrow CO_2 + H_2$

The reforming reaction is typically performed using a nickel catalyst. While part of the reforming is often carried out in a prereformer, in many applications, at least some of the reforming takes place within the molten-carbonate fuel cell itself. This process is known as "direct internal reforming" (DIR). As the reforming reaction is endothermic, it is advantageously performed using the heat generated in the electrochemical reaction. Moreover, the consumption of hydrogen in the cell helps to shift the equilibrium of the reformation reaction to the desired hydrogen product. However, the high operating temperature places severe demands on the corrosion stability and life of cell components. Critically, alkali hydroxides can vaporize from the electrolyte at the high operating temperatures and poison the reforming catalyst.

There remains a need for improved reforming catalysts that are suitable for use in molten carbonate fuel cells and are more resistant to alkali poisoning than conventional catalysts.

SUMMARY OF THE DISCLOSURE

In one aspect, the present disclosure provides a catalyst material including a catalyst material comprising, an alumina carrier in an amount in the range of about 5 wt % to about 75 wt %; and a mixed metal oxide in an amount in the range of about 25 wt % to about 95 wt %, the mixed metal oxide including at least about 90 wt % of oxides of nickel and aluminum, the mixed metal oxide having an atomic ratio of nickel to aluminum in the range of about 60:40 to about 90:10, the mixed metal oxide being substantially free of zirconium, in the form of a composite of the alumina carrier and the mixed metal oxide.

In another aspect, the present disclosure provides a process for reforming a hydrocarbon, the process comprising providing a catalyst material as described herein, reducing at least some of the oxide of nickel to metallic nickel to form a reduced catalyst material, and reacting the hydrocarbon with water in the presence of the reduced catalyst material.

In another aspect, the present disclosure provides a fuel cell comprising an anode, a cathode, a metal carbonate electrolyte in contact with the anode and the cathode, and a catalyst material as described herein in fluid communication with the electrolyte.

DETAILED DESCRIPTION

Figure 1:
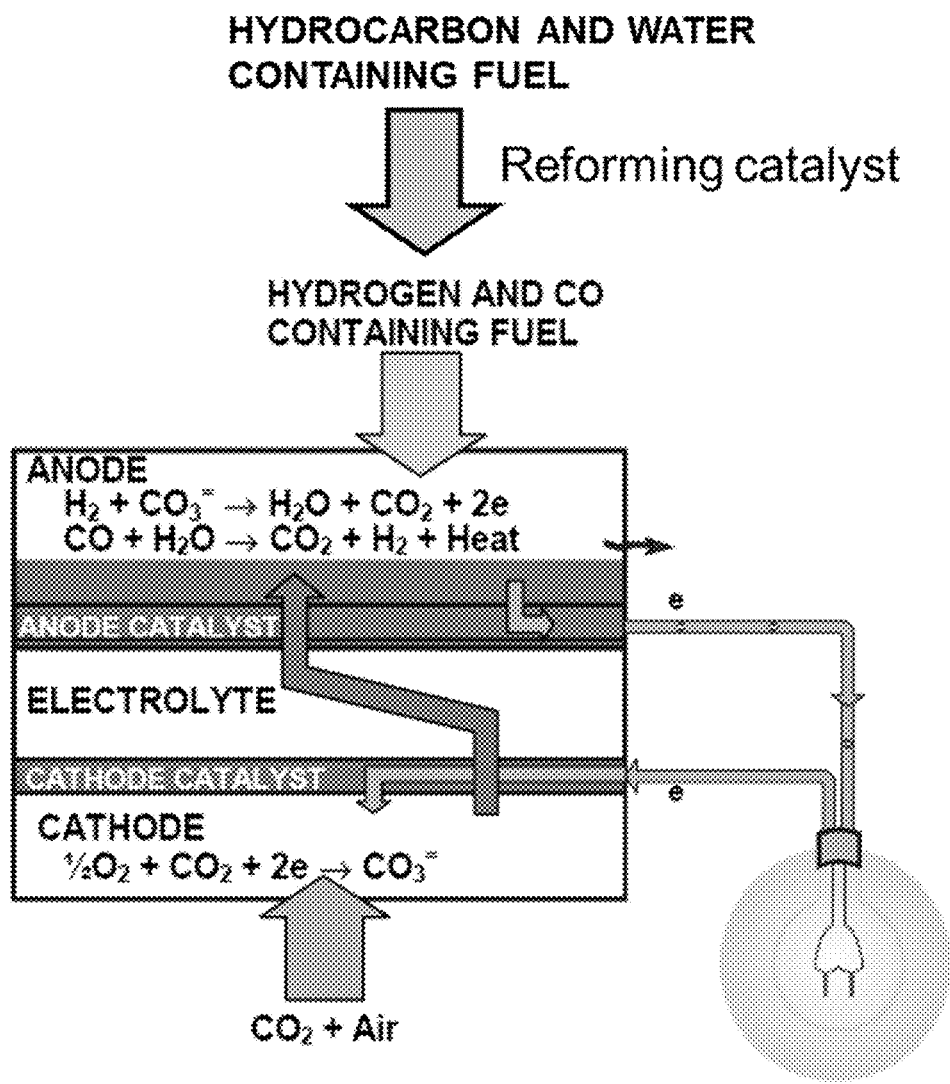
FIG. 1 shows the operating configuration of one embodiment of a molten carbonate fuel cell.

Before the disclosed processes and materials are described, it is to be understood that the aspects described herein are not limited to specific embodiments, apparati, or configurations, and as such can, of course, vary. It is also to be understood that the terminology used herein is for the purpose of describing particular aspects only and, unless specifically defined herein, is not intended to be limiting.

Throughout this specification, unless the context requires otherwise, the word "comprise" and "include" and variations (e.g., "comprises," "comprising," "includes," "including") will be understood to imply the inclusion of a stated component, feature, element, or step or group of components, features, elements or steps but not the exclusion of any other integer or step or group of integers or steps.

As used in the specification and the appended claims, the singular forms "a," "an" and "the" include plural referents unless the context clearly dictates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the term "contacting" includes the physical contact of at least one substance to another substance.

All percentages, ratios and proportions herein are by weight, unless otherwise specified. A weight percent (weight %, also as wt %) of a component, unless specifically stated to the contrary, is based on the total weight of the formulation or composition in which the component is included (e.g., on the total amount of the catalyst material). All mol % values are based on the moles of metal atoms.

As described above, conventional nickel oxide reformation catalysts can be poisoned by vaporization of the alkali carbonate electrolyte in DIR molten metal carbonate cells. The inventors have determined that the provision of nickel oxide as a mixed nickel/aluminum oxide supported on alumina can provide resistance to poisoning while retaining acceptable activity as an in-situ reformation catalyst. Moreover, the inventors have determined that such catalyst materials are particularly less susceptible to loss of physical integrity (e.g., crush strength, attrition) especially during the start-up procedure where nickel oxide is reduced to metallic nickel. Consequently, it is desirable for the catalyst to maintain physical integrity. Notably, such materials can be provided without the use of zirconium.

Accordingly, one embodiment of the disclosure is a catalyst material that includes an alumina carrier in an amount in the range of about 5 wt % to about 75 wt %; and a mixed metal oxide in an amount in the range of about 25 wt % to about 95 wt %. The mixed metal oxide includes at least about 95 wt % of oxides of nickel and aluminum, and the atomic ratio of nickel to aluminum is in the range of about 60:40 to about 90:10. Notably, the mixed metal oxide is substantially free of zirconium. The catalyst material is provided as a composite of the alumina and the mixed metal oxide. Accordingly, while the material is provided as relatively larger physical units, the individual mixed metal oxide and alumina materials are discernible in the composite, e.g., by microscopy.

As used herein, "alumina" is aluminum oxide, aluminum hydroxides, and hydrated alumina (including crystalline forms of these hydrated alumina such as trihydroxides which include gibbsite, bayerite, nordstrandite, aluminum oxide-hydroxides such as crystalline boehmite, pseudo-boehmite, and diaspore), that is not a mixed metal oxide, i.e., it is substantially an aluminum oxide, aluminum hydroxide or a hydrated aluminia. A number of types of alumina (e.g., in different phases) can be used in the catalyst materials described herein. In certain embodiments, the alumina carrier is selected from χ-alumina, η-alumina, ρ-alumina, γ-alumina, δ-alumina and θ-alumina. A mixture of types can optionally be used. In certain embodiments, the alumina carrier is γ-alumina, δ-alumina or θ-alumina, or a mixture thereof. In certain embodiments, the alumina carrier is at least 80%, at least 90%, at least 95%, or at least 99% γ-alumina. In certain embodiments, the alumina carrier is substantially γ-alumina. The phase character of the alumina carrier can be determined by the person of ordinary skill in the art, using, for example, x-ray diffraction techniques.

The mixed metal oxide is a mixed oxide of chiefly nickel and aluminum. As described above, at least about 95 wt % of the mixed metal oxide is oxides of nickel and aluminum. In certain embodiments, the mixed metal oxide includes at least about 95 wt %, at least about 97 wt %, at least about 98 wt %, at least about 99 wt % oxides of nickel and aluminum, or at least about 99.5 wt % oxides of nickel and aluminum. In certain embodiments, the mixed metal oxide consists essentially of, or consists of oxides of nickel and aluminum.

Of course, in other embodiments, the mixed metal oxides can include oxide(s) of one or more additional metals. In certain embodiments, the additional metals do not include both magnesium and silicon (i.e., at levels more than 0.5 wt %, 0.2 wt %, or even 0.1 wt %). In certain embodiments, the additional metals are not magnesium or silicon (i.e., at levels more than 0.5 wt %, 0.2 wt %, or even 0.1 wt %).

As noted above, the mixed metal oxide has an atomic ratio of nickel to aluminum in the range of about 60:40 to about 90:10. In certain embodiments, the atomic ratio of nickel to aluminum is about 60:40 to about 85:15, or about 60:40 to about 80:20, or about 60:40 to about 75:25, or about 65:35 to about 90:10, or about 70:30 to about 90:10, or about 75:25 to about 90:10, or about 65:35 to about 85:15, or about 70:30 to about 80:20, or about 72:28 to about 78:22, or about 74:26 to about 76:24.

As described above, the alumina carrier is present in the catalyst material in an amount in the range of about 5 wt % to about 75 wt %. In certain embodiments, the alumina carrier is present in an amount in the range of about 30 wt % to about 70 wt %, or about 35 wt % to about 65 wt %, or about 40 wt % to about 60 wt %, or about 45 wt % to about 55 wt %, or about 47 wt % to about 53 wt %, or about 49 wt % to about 51 wt %, or about 25 wt % to about 65 wt %, or about 25 wt % to about 55 wt %, or about 35 wt % to about 55 wt %, or about 35 wt % to about 75 wt %, or about 45 wt % to about 75 wt %, or about 45 wt % to about 65 wt %.

Similarly, as described above, the mixed metal oxide is present in the catalyst material in an amount in the range of about 25 wt % to about 95 wt %. In certain embodiments, the mixed metal oxide is present in an amount in the range of about 30 wt % to about 70 wt %, or about 35 wt % to about 65 wt %, or about 40 wt % to about 60 wt %, or about 45 wt % to about 55 wt %, or about 47 wt % to about 53 wt %, or about 49 wt % to about 51 wt %, or about 25 wt % to about 65 wt %, or about 25 wt % to about 55 wt %, or about 35 wt % to about 55 wt %, or about 35 wt % to about 75 wt %, or about 45 wt % to about 75 wt %, or about 45 wt % to about 65 wt %.

As the person of ordinary skill in the art will appreciate, the catalyst material can be provided in a variety of forms, depending on the desired end use. For example, the catalyst material can be provided in the form of a plurality of tablets, pellets or extrudates. Such a catalyst material can be useful, for example, in a fixed bed process, such as those typically used in the reforming step of a Direct Internal Reforming (DIR) process. In certain embodiments, the plurality of tablets, pellets or extrudates has an average diameter in the range of about 0.7 mm to about 6 mm (e.g., about 1 mm to about 3 mm), and an average pellet length in the range of about 2 mm to about 15 mm (e.g., about 1 mm to about 5 mm). Catalyst materials as described herein can be provided in a variety of shapes, such as cylinders (hollow or otherwise), parallelepipeds (hollow or otherwise), symmetrical or asymmetrical trilobes or quadrulobes, spheres, etc. Catalyst materials may also be coated on to a substrate or support, such as a ceramic surface or an internal surface of a reactor.

As described above, the catalyst materials described herein are provided as composites of the alumina carrier and the mixed metal oxide. In certain embodiments, the catalyst material is provided as a composite of particles of the alumina carrier and particles of the mixed metal oxide.

In certain such embodiments, the particles of the alumina carrier have a median particle size in the range of about 0.3 µm to about 1 mm, for example, in the range of about 0.3 µm to about 500 µm, or about 0.3 µm to about 100 µm, or about 0.3 µm to about 50 µm, or about 1 µm to about 1 mm, or about 1 µm to about 500 µm, or about 1 µm to about 200 µm, or about 1 µm to about 50 µm, or about 5 µm to about 1 mm, or about 5 µm to about 500 µm, or about 5 µm to about 200 µm, or about 5 µm to about 50 µm, or about 10 µm to about 1 mm, or about 10 µm to about 500 µm, or about 10 µm to about 200 µm, or about 10 µm to about 50 µm. In certain such embodiments, the particles of the mixed metal oxide have a median particle size in the range of about 0.5 µm to about 2 mm, for example, in the range of about 1 µm to about 2 mm, or about 1 µm to about 1 mm, or about 1 µm to about 500 µm, or about 1 µm to about 250 µm, or about 1 µm to about 100 µm, or about 1 µm to about 50 µm, or about 5 µm to about 2 mm, or about 5 µm to about 1 mm, or about 5 µm to about 500 µm, or about 5 µm to about 250 µm, or about 5 µm to about 100 µm, or about 5 µm to about 50 µm, or about 10 µm to about 2 mm, or about 10 µm to about 1 mm, or about 10 µm to about 500 µm, or about 10 µm to about 250 µm, or about 10 µm to about 100 µm, or about 10 µm to about 50 µm, or about 50 µm to about 2 mm, or about 50 µm to about 1 mm, or about 50 µm to about 700 µm, or about 50 µm to about 350 µm, or about 50 µm to about 150 µm, or about 50 µm to about 100 µm. Median particle sizes can be determined as the d50 value using laser light scattering techniques, evaluating the data using the Fraunhofer method.

The catalyst materials described herein can be provided with a variety of different pore volumes, depending, e.g., on the processes used for making them and the desired end use. For example, in certain embodiments, a catalyst material as described herein has a pore volume within the range of about 0.05 to about 1.5 cm$^3$/g, or about 0.1 to about 1.5 cm$^3$/g, or about 0.2 to about 1.5 cm$^3$/g, or about 0.3 to about 1.5 cm$^3$/g, or about 0.5 to about 1.5 cm$^3$/g, or 0.05 to about 1 cm$^3$/g, or about 0.1 to about 1 cm$^3$/g, or about 0.2 to about 1 cm$^3$/g, or about 0.3 to about 1 cm$^3$/g, or about 0.5 to about 1 cm$^3$/g, or 0.05 to about 0.5 cm$^3$/g, or about 0.1 to about 0.5 cm$^3$/g, or about 0.1 to about 4 cm$^3$/g, or about 0.2 to about 0.5 cm$^3$/g. The person of ordinary skill in the art can, in view of the processes described herein, provide a desired pore volume to a catalyst material. Pore volumes are measured by Hg porisometry, and provide the total volume or pores below 5000 Å in size. The person of ordinary skill in the art can, in view of the processes described herein, provide a desired pore volume to a catalyst material.

Similarly, the catalyst materials described herein can be provided with a variety of different surface areas, depending, e.g., on the processes used for making them and the desired end use. The surface areas are measured using the Brunauer-Emmett-Teller (BET) Surface Area method. In certain embodiments, a catalyst material as described herein has a surface area within the range of from about 10 to about 400 m$^2$/g, or about 50 to about 400 m$^2$/g, or about 70 to about 400 m$^2$/g, or about 100 to about 400 m$^2$/g, or about 200 to about 400 m$^2$/g, or about 300 to about 400 m$^2$/g, or about 10 to about 300 m$^2$/g, or about 50 to about 300 m$^2$/g, or about 70 to about 300 m$^2$/g, or about 100 to about 300 m$^2$/g, or about 200 to about 300 m$^2$/g, or about 100 to about 250 m$^2$/g, or about 10 to about 200 m$^2$/g, or about 50 to about 200 m$^2$/g, or about 70 to about 200 m$^2$/g, or about 100 to about 200 m$^2$/g. In one embodiment, a catalyst material as described herein has a surface area of about 20 to about 300 m$^2$/g. In another embodiment, a catalyst material as described herein has a surface area of about 30 to about 200 m$^2$/g. In another embodiment, a catalyst material as described herein has a surface area of about 70 to about 300 m$^2$/g. The person of ordinary skill in the art can, in view of the processes described herein, provide a desired surface area to a catalyst material.

The catalyst materials described herein may be prepared by conventional procedures, as would be understood by the person of ordinary skill in the art. For example, in one embodiment, precipitation techniques are used to make the catalyst material. For example, in one embodiment, the mixed metal oxide is formed by precipitation of one or more water soluble precursor materials with a precipitation agent, for example, in the presence of the alumina carrier. Each precursor material may be a water soluble metal salt such as, but not limited to, a metal nitrate, a metal sulfate, a metal halide, or a metal acetate. The precipitation agent may be, for example, ammonium hydroxide, ammonium carbonate, a metal hydroxide, or a metal carbonate. The person of ordinary skill in the art can select other suitable precipitation agents, based on the particular metal oxide precursors and the pH-dependence of their solubility properties. Precipitated materials can be formed using conventional methods (e.g., tableting or extrusion) into a desired shape, as would be evident to the person of ordinary skill in the art. The person of ordinary skill in the art will also appreciate that such materials can be formed using optional processing aids, lubricants and/or binders, depending on the particular metals used and the desired active material properties. The formed materials can be dried and calcined to provide the catalyst materials described herein. Various aluminum oxides and aluminum hydroxides can be used as raw material to provide the alumina carrier; as the person of ordinary skill in the art, they can be converted to a desirable alumina form via heat treatment during processing.

As noted above, the catalyst materials described herein can be used in reforming a hydrocarbon. The process can comprise providing a catalyst material as described herein, reducing at least some of the oxide of nickel to metallic nickel to form a reduced catalyst material, and reacting the hydrocarbon with water in the presence of the reduced catalyst material. The reduction can be performed, for example, with hydrogen. The reforming reaction can be performed, for example, as a direct internal reforming process in a molten metal carbonate fuel cell, for example, with the catalyst material as described herein in fluid communication with the molten metal carbonate electrolyte of the fuel cell. The reforming reaction can be performed, for example, at temperatures in the range of 300° C. to 1000° C.

Another embodiment of the disclosure is a fuel cell that includes an anode, a cathode, a metal carbonate electrolyte in contact with the anode and the cathode, and a catalyst material as described herein in fluid communication with the electrolyte. FIG. 1 shows the operating configuration of one embodiment of a molten carbonate fuel cell. Here, the electrolyte is disposed between an anode and a cathode. The anode can include, for example, a Ni—Cr, a Ni—Al or a Ni—Al—Cr material for catalysis of the anode half-reaction. The cathode can include, for example, a lithiated NiO—MgO material for catalysis of the cathode half-reaction. The electrolyte can be supported, for example, on a lithium/aluminum oxide carrier. The electrolyte can be, for example, a mixed alkali carbonate salt, e.g., including lithium carbonate and sodium carbonate and/or other alkali carbonates. The person of ordinary skill in the art can adapt conventional molten carbonate fuel cells and methodologies for use with the direct internal reforming catalysts described herein.

Certain aspects of the disclosure are now explained further via the following non-limiting examples.

EXAMPLES

A nickel/aluminum oxide catalyst was prepared to form tablets of a comparative material. The precipitated sample was prepared by adding together in a controlled manner at a temperature between 55 to 75° C. a solution of sodium carbonate and a solution containing a mixture of Ni(NO3)2 and Al(NO3)3 until the pH was in the range of 6-8. The resulting mixture was then allowed to heat to up to 80° C. and held for one hour while being continuously stirred. After aging, the resulting slurry was filtered and the resulting filter cake was washed with D.I. water until the filter cake contained less than 0.1% sodium. The precipitate was then dried, and calcined. The resulting material was sized for tablet feed. Tablets were produced on a tablet press to form a comparative material. The final catalyst consisted of 74% NiO and 26% Al2O3.

A nickel/aluminum oxide catalyst according to the present disclosure was then prepared. 3 kg of the above sized material was mixed with 1 kg of alumina (BET surface area of 170 m2/g, pore volume of 0.3 cc/g, d50 of the alumina is 80 μM) and 120 grams of graphite, and tablets were produced on a tablet press. The final catalyst consists of 54% NiO and 46% Al2O3.

Figure 2:
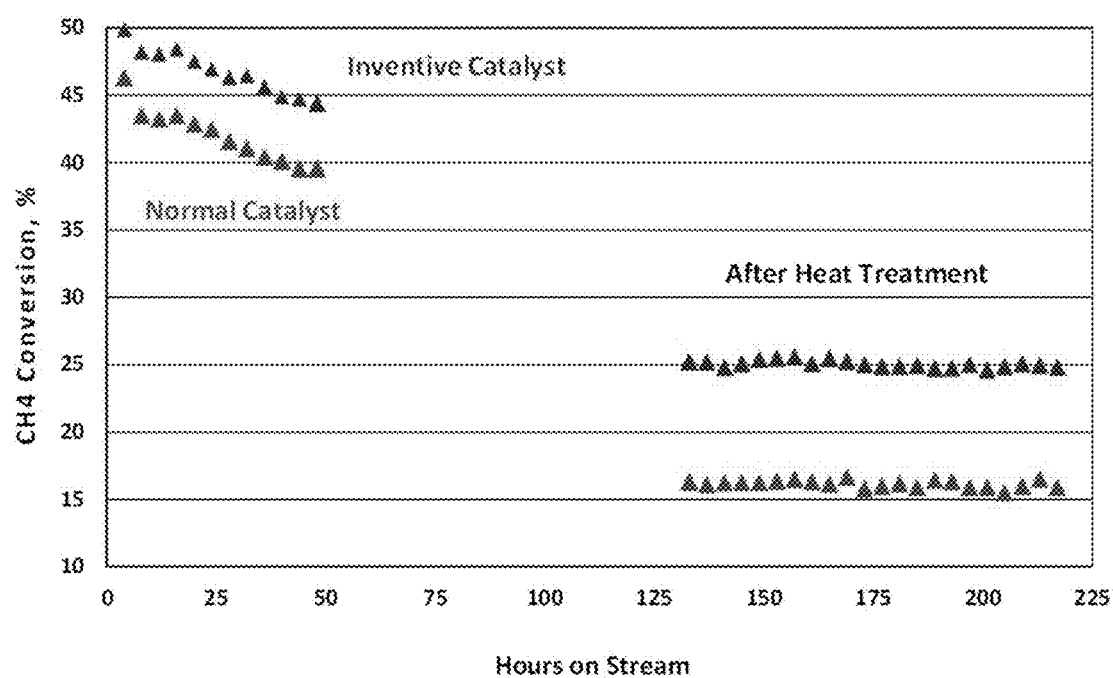
FIG. 2 is a plot of methane conversion before and after catalyst deactivation treatment, as described in more detail in the Examples, below.

The activity and stability of the catalyst as according to the present disclosure was compared with that of the comparative catalyst. Test reactions were performed in a ¾" I.D. tubular reactor. Typically, 6.5 mL of catalyst material was loaded into the reactor with layers of silicon carbide balls on the top and bottom of the catalyst bed. Electrolyte (mixed alkali carbonates) was loaded on top of the catalyst bed. After reduction of the catalyst material in hydrogen, a steam reforming reaction was performed with dry feed gas consisting of 6.6% $CO_2$, 2% $N_2$, 65% $CH4$ and 26.4% $H_2$, and a steam/feed molar ratio of 2.7. The space velocity was maintained at 18,000/hr with pressure at 15 psig. The reactor temperature was increased to 700° C. An on-line gas chromatograph was used to measure inlet and outlet amounts of $N_2$, CO, $CO_2$ and $CH_4$. Methane conversion, used as an indicator of activity, was then calculated based on the inlet and outlet flow rates. After deactivation treatment, activity of the catalyst was again measured. The activity after deactivation treatment is indicative of catalyst stability. FIG. 2 is a plot of methane conversion of the catalyst as described herein and the conventional catalyst, both before and after the deactivation treatment. The catalyst described herein exhibits high stability, as reflected by high activity after deactivation treatment in the presence of the electrolyte.

We claim:

1. A catalyst material comprising,
   an alumina carrier in an amount in the range of about 25 wt % to about 65 wt %; and
   a mixed metal oxide in an amount in the range of about 35 wt % to about 75 wt, the mixed metal oxide including at least about 90 wt % of oxides of nickel and aluminum, the mixed metal oxide having an atomic ratio of nickel to aluminum in the range of about 70:30 to about 90:10, the mixed metal oxide being substantially free of zirconium,
   in the form of a fused composite of the alumina carrier and the mixed metal oxide.

2. The catalyst material according to claim 1, wherein the alumina carrier is substantially γ-alumina.

3. The catalyst material according to claim 1, wherein the mixed metal oxide includes at least about 95 wt % oxides of nickel and aluminum.

4. The catalyst material according to claim 1, wherein the mixed metal oxide further includes oxide(s) of one or more additional metals.

5. The catalyst material according to claim 1, wherein the mixed metal oxide consists essentially of oxides of nickel and aluminum.

6. The catalyst material according to claim 1, wherein the sum of the amount of the alumina carrier and the mixed metal oxide in the catalyst material is at least about 90%.

7. The catalyst material according to claim 1, wherein the catalyst material consists essentially of the alumina carrier and the mixed metal oxide.

8. The catalyst material according to claim 1, wherein the atomic ratio of nickel to aluminum in the mixed metal oxide is about about 75:25 to about 90:10.

9. The catalyst material according to claims 1, wherein the alumina carrier is present in an amount in the range of about about 45 wt % to about 75wt %, and the mixed metal oxide is present in an amount in the range of about 25wt % to about 55wt %.

10. The catalyst material according to claim 1, wherein the catalyst material is in the form of a plurality of tablets, pellets or extrudates.

11. The catalyst material according to claim 10, wherein the plurality of tablets, pellets or extrudates has an average diameter in the range of about 0.7 mm to about 6 mm, and an average pellet length in the range of about 2 mm to about 15 mm.

12. The catalyst material according to claim 1, wherein the fused composite is a fused composite of particles of the alumina carrier and particles of the mixed metal oxide, and wherein the particles of the alumina carrier have a median particle size in the range of about 0.3 μm to about 1 mm.

13. The catalyst material according to claim 1, wherein the fused composite is a fused composite of particles of the alumina carrier and particles of the mixed metal oxide, and wherein the particles of the mixed metal oxide have a median particle size in the range of about 0.5 μm to about 2 mm.

14. The catalyst material according to claim 1, having a pore volume within the range of about 0.1 to about 0.4cm$^3$/g.

15. The catalyst material according to claim 1, having a surface area within the range of from about 100 to about 300 m$^2$/g.

16. A process for reforming a hydrocarbon, the process comprising providing a catalyst material according to claim 1, reducing at least some of the oxide of nickel to metallic nickel to form a reduced catalyst material, and reacting the hydrocarbon with water in the presence of the reduced catalyst material.

17. The process according to claim 16, performed as a direct internal reforming process in a molten metal carbonate fuel cell.

18. The process according to claim 16, wherein the reforming is conducted at a temperature in the range of 300 ° C. to 1000 ° C.

19. A fuel cell comprising an anode, a cathode, a metal carbonate electrolyte in contact with the anode and the cathode, and a catalyst material according to claim 1 in fluid communication with the electrolyte.

20. The catalyst material according to claim 1, wherein the mixed metal oxide includes at least about 98 wt % oxides of nickel and aluminum and wherein the sum of the amount of the alumina carrier and the mixed metal oxide in the catalyst material is at least about 98 %.

21. The catalyst material according to claim 1, wherein
the alumina carrier is present in an amount in the range of about 25 wt % to about 55 wt %;
the mixed metal oxide is present in an amount in the range of about 45 wt % to about 75 wt %; and
the atomic ratio of nickel to aluminum in the mixed metal oxide is in the range of about 75:25 to about 90:10.

22. The catalyst material according to claim 1, wherein
the alumina carrier is present in an amount in the range of about 25 wt % to about 55 wt %;
the mixed metal oxide is present in an amount in the range of about 45 wt % to about 75 wt %; and
the atomic ratio of nickel to aluminum in the mixed metal oxide is in the range of about 80:20 to about 90:10.

* * * * *